Nov. 26, 1946.   J. BERGIER ET AL   2,411,513
MEASURING DEVICE
Filed Feb. 26, 1943
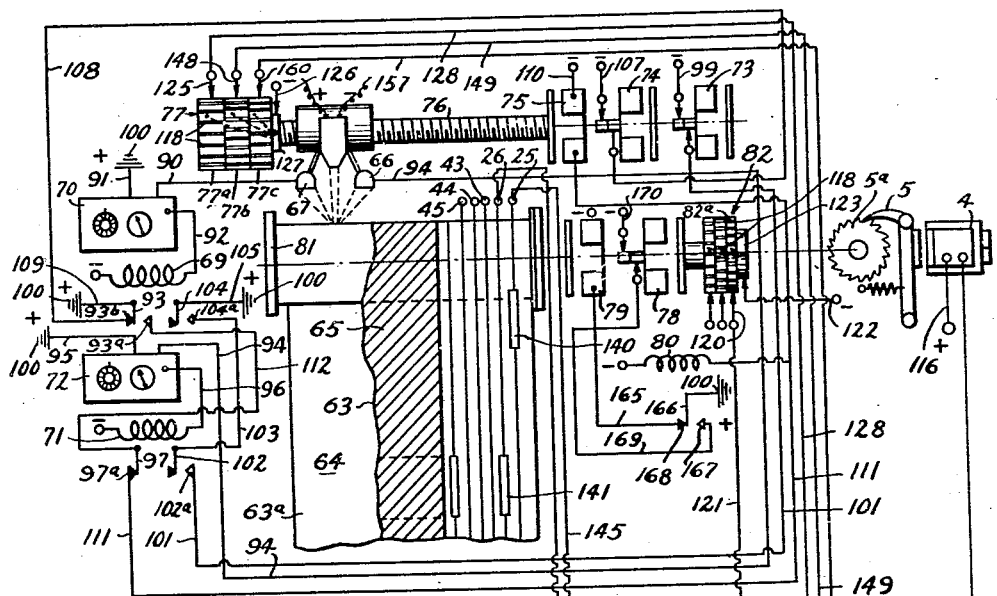
Fig. 1.
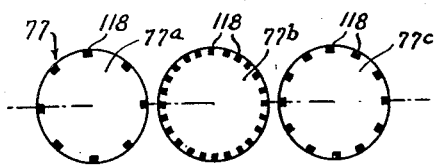
Fig. 1A.
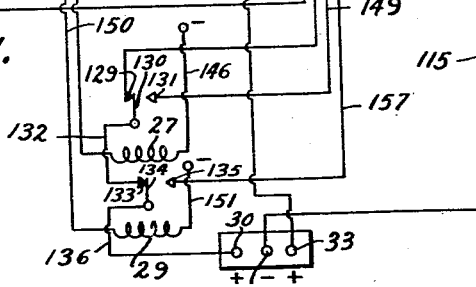
Fig. 1B.
Fig. 2.
INVENTORS
Jacques Bergier,
Alfred Eskenazi,
and André Helbronner.
BY
ATTORNEY.

UNITED STATES PATENT OFFICE 2,411,513

MEASURING DEVICE

Jacques Bergier, Alfred Eskenazi, and André Helbronner, Lyon, France; vested in the Alien Property Custodian Application February 26, 1943, Serial No. 477,311

10 Claims. (Cl. 177—380)

The present invention relates to an emitter of electrical impulses actuated by an automatic pattern-following apparatus.

The present device produces electrical impulses which are all identical (in duration, voltage and amperage of the direct current involved). The number of said impulses is directly proportional to the movement of a scanning or exploring device with reference to a pattern to be followed.

The pattern-following devices themselves, of course, are already well-known and the invention consists in a new use of these devices in association with electrical contactors.

Fig. 1 shows the use in combination of a photoelectric pattern-following device and a contactor accordance to the present invention.

Fig. 1A is a schematic view showing the different contactor series.

Fig. 1B is an enlarged detail view of the photoelectrical pattern-follower disclosed in Fig. 1.

Fig. 2 shows the use in combination, according to the present invention, of a pattern-following device using a curve forming the boundary between a conducting and an insulated area, and of an emitter of electrical impulses.

Fig. 1 shows, for instance, the use for the purposes of the present invention of a photoelectrical pattern-follower. The curve 63 to be followed separates a reflecting surface 64 from a blackened surface 65. The two photocells 66 and 67 receive the light from the focalizer 68, which projects a spot of light on the curve 63. For example, the focalizer 68 may be constructed so that the light from source 68a (Fig. 1B) will pass through lens system 68b and be focused into a spot upon sheet 63a. The photocells 66 and 67 may likewise be arranged so that the cells are focused upon adjacent halves of the light spot.

The curve unrolls under the spot by means of a drum on which it is fixed and which is driven by a clutch 78 cooperating with a brake 79, said clutch 78 being disposed in a circuit designated by elements 100, 166, 167, 169 and 170. The brake 79 is disposed in the circuit designated by elements 165, 166, 168 and 100. The relay 80, energized at the same time as the brake 75, co-ordinates the motion of the focalizer 68 with that of the drum carrying the curve 63, in such a way that the drum 81 on which the curve is fixed only rotates when the spot is directed upon the curve. If the apparatus shown is used to control a reproducing metal working machine, it may become necessary to send special signals to put into reverse the organs of the controlled machine when a bend in the followed curve is reached, or when the slope of the tangent to the curve inverts itself relative to the path of movement of the followed curve. Otherwise, the curve traced by the reproducing machine would be the reverse of the desired curve. Therefore, brushes 25, 26, 43, 44, 45 (which can make contact with a surface connected with the + pole of a battery) are used to signal the changes of scale in the model, and the inversion points of the curve.

In this form of the invention, an impulse from the controlled machine enters at point 32 and passes through the circuit comprising wires 115 and 116 and magnet 4, causing pawl 5 to advance the ratchet 5a, the contactor 82, the pattern drum 81, and the pattern sheet 63a. The contactor 82 is constructed similar to the contactor 77, disclosed in Fig. 1A, and also similar to the contactor shown in copending application Serial No. 477,310. In other words, the contact series 82a of contactor 82 has equally spaced insulating segments 118 inserted in the periphery thereof, the spaces between the segments being formed from conductive material.

As the contactor 82 is rotated, the circuit comprising wire 122, ring 123, contact series 82a, brush 120, and wire 121 is interrupted each time the brush 120 passes over an insulation insert 118, thereby emitting impulses at point 33 proportional in number to the movement of the pattern sheet 63a relative to the focalizer. These impulses are associated with the longitudinal coordinate axis of the curve.

If a spot of light from focalizer 68 falls on the reflecting surface 64 of sheet 63a, the relay 69 will be energized by circuits comprising cell 67, wire conduit 90, amplifier 70, wires 91 and 92 and ground 100, thereby connecting switch contact 93 with 93a, and 104 with 104a, and disconnecting 93 from 93b. At the same time the relay 71 will be energized by circuits comprising cell 66, wire conduit 94, amplifier 72, wires 95 and 96, and ground 100, thereby connecting switch contact 102 with 102a, and disconnecting contact 97 from 97a. With the relays 69 and 71 thus energized, the circuit comprising wire 99, clutch 73, wire 101, contacts 102, 102a, wire 103, contacts 104, 104a, wire 105, and ground 100 will be closed; and the clutch 73 will then rotate micrometer screw 76 in the proper direction to advance focalizer 68 to the right. While the focalizer is advancing to the right, the circuit through clutch 74, comprising wires 107, 108 and 109 will be broken at 93, 93b, and therefore clutch 74 will be disconnected.

When the focalizer 68 moves to the right far enough to permit the spot of light to be centered upon the curve, the relay 71 will be cut off since light will not be reflected onto cell 66, and then contacts 97 and 97a will engage each other to complete the circuit through the brake 75, which in turn, will prevent rotation of screw 76 while the spot of light is on the curve. The brake circuit comprises wire 110, brake 75, wire 111, contacts 97, 97a, wire 112, contacts 93, 93a, wire 109 and ground 100.

On the contrary, if the spot of light falls on the blackened surface 65, neither of the relays 69 and 71 is energized, and the focalizer 68 is moved to the left by the clutch 74 until the light spot is back on the curve. In other words, the circuit designated by numerals 107, 108, 93, 93b, 109 and 100 for clutch 74 will be in normally closed position, while the previously described circuit for clutch 73 is interrupted at 102, 102a, and at 104, 104a. The circuit for brake 75 will also be interrupted at 93, 93a. It is therefore apparent that the clutch 74 will rotate the screw 76 in the proper direction to move the focalizer 68 to the left until the spot of light reaches the curve.

When the spot of light from the focalizer is exactly on the curve, the cell 67 receives light, while the cell 66 is in the dark. The relay 69 is then energized through amplifier 70, while relay 71 is not energized. Such being the case, the circuit for clutch 74 will be broken at 93, 93b; and the circuit for clutch 73 will be broken at 102, 102a, and as a result the focalizer will remain stationary with the spot centered upon the curve.

The micrometer screw 76 actuates a contactor 77 for emitting impulses proportional in number to the amplitude of movement of focalizer 68 along screw 76. Contactor 77 is divided into three series 77a, 77b, and 77c (Fig. 1A), and each series comprises a plurality of equally spaced conductive surfaces arranged on the periphery of the contactor and separated by insulation inserts 118. The number of contacts in each series is different, and impulses are emitted through only one series at a time.

In the position of the focalizer shown in Fig. 1 the impulses are being emitted through series 77a as the screw 76 is rotated. Each time the brush 125 passes over an insulation insert in series 77a a circuit is interrupted and impulses are emitted at point 30, said circuit comprising brush 126, ring 127, series 77a, brush 125, wire 128, contacts 129, 130, wire 132, contacts 133, 134, wire 136 and point 30.

Where the radius of curvature is sharp, it is often necessary to change the scale of the pattern in this region; therefore it becomes necessary to vary at will the number of impulses emitted per unit of curve length along one axis. Under such conditions, it is necessary to change-over from series 77a to series 77b or 77c.

Along a length on the pattern sheet 63a corresponding to the place where the number of impulses per unit length is to be varied, conductive areas 140 and 141 are provided, and these areas are connected to the positive pole of a battery. The adjacent portions of the sheet which slide underneath brushes 25 and 26 are covered with insulating varnish.

When the sheet 63a is advanced until area 140 is disposed beneath brush 25, a relay circuit comprises, area 140, brush 25, wire 145, relay 27, and wire 146 will be completed to thereby energize relay 27 and thus cause contacts 130, 131 to be connected, while contacts 129, 130 are disconnected. The connection of contacts 130, 131 will complete a circuit comprising brush 148, wire 145, contacts 130, 131, wire 132, contacts 133, 134, wire 136 to thereby emit impulses produced by series 77b at point 30.

In a similar manner, when area 141 moves beneath brush 26, a circuit comprising area 141, brush 26, wire 150, relay 29, and wire 151 will be completed, and thus relay 29 will be energized. The energized relay 29 will then disconnect contacts 133, 134 and connect contacts 134 and 135.

The latter contacts close the circuit comprising brush 126, ring 127, series 77c, brush 160, wire 157, contacts 134, 135, wire 136, and thus transmit the impulses produced by series 77c at point 30.

Therefore, it is apparent that a first series of impulses corresponding to the longitudinal coordinates of the curve is emitted by contactor 77 driven by the screw 76 through a transmission. Also a second series of impulses corresponding to the other coordinate is emitted by the other contactor 82 driven by the axle of drum 81.

Fig. 2 shows a device which is quite similar in principle, but in which the relays 69 and 71, instead of being controlled by photocells are energized by brushes travelling on a surface in which the curve to be followed forms the boundary between a conducting surface 83 connected to the + pole of a battery and an insulated surface 84. The two brushes 85 and 86 are very near one to another, the distance between them being slightly greater than the width of the boundary line. When the two brushes are on the left of the boundary line, the two relays 69 and 71 are excited and, as has been already explained concerning Fig. 1, the brushes are moved to the right (by magnetic clutches not shown in Fig. 2). When the brush 85 is on the insulated area and the brush 86 is on the conducting one (i. e. when the boundary line is situated between the two brushes), the brake stops the screw 76 and the synchronization relay 80 allows the curve to unroll under the brushes. If this motion brings the two brushes on the insulating surface, then the two relays 69 and 71 being cut off, the brushes 85 and 86 will be driven to the left until they again straddle the curve. The brake then acts on the screw 76 and the synchronization relay 80 will again drive the drum 81. The same devices for signalling the change in scale as that shown in Fig. 1 are used.

We claim:

1. In an automatic curve follower, a curve following device, means for producing relative movement between said device and said curve along one axis, means for producing relative movement between said device and said curve along an axis transversely of said first named axis, means for forcing said device to follow said curve during said axial movements, a plurality of series of impulse means, each series having a different number of contacts therein and being simultaneously operable at the same speed with relation to the device to emit impulses proportional in number to the unit of movement of said device along one of said axes, and means operable during the movement along said other axis for automatically selecting any one of said series for operation.

2. In an automatic curve follower, a curve following device, means for producing relative movement between said device and said curve along one axis, means for producing relative movement between said device and said curve along an axis transversely of said first named axis, means for forcing said device to follow said curve during said axial movements, a plurality of series of impulse means, each series having a different number of equally spaced contacts and being simultaneously operable at the same speed with relation to the device to emit impulses proportional in number to the unit of movement of said device along one of said axes, means controlled by the movement along said other axis for operating at least two of said series in succession, and a second impulse means for emitting impulses proportional in number to the movement along said other axis.

3. In an automatic curve follower, a curve following device, means for producing relative movement between said device and said curve along one axis, means for producing relative movement between said device and said curve along an axis transversely of said first named axis, means for forcing said device to follow said curve during said axial movements, impulse means actuated by said device to emit impulses proportional in number to the movement along one of said axes, and means controlled by the movement along said other axis for varying the number of impulses emitted by said impulse means per unit of movement along said first axis.

4. In an automatic curve follower, a curve following device, means for producing relative movement between said device and said curve along one axis, means for producing relative movement between said device and said curve along another axis transversely of said first axis, means for forcing said device to follow said curve during said axial movements, a plurality of series of electrical contacts actuated simultaneously at the same speed with relation to the device during the movement of the latter along one of said axes, each of said series having a different number of equally spaced contacts to emit electrical impulses proportional in number to the unit of movement along said last-named axis, means controlled by the movement along said other axis for selectively operating each of said series, and an impulse means for emitting impulses proportional in number to the movement along said other axis.

5. In an automatic curve follower, a curve following device, a rotatable micrometer screw supporting said device for movement back and forth along one axis, means for moving said curve along a second axis transversely of said first named axis, means for forcing said device to follow said curve during said axial movements, impulse means actuated by said micrometer screw for emitting impulses proportional in number to the back and forth movement of said device along the first named axis, and means controlled by the movement along the second axis for varying the number of impulses emitted by the impulse means per unit of movement along the first axis.

6. In an automatic curve follower, a sheet having a curve thereon, said curve forming the boundary between a light-reflecting and a light-absorbing surface, a source of light, an optical system for projecting a spot of light from said source onto said sheet, a rotating drum upon which said sheet is wound, means for unwinding said sheet to produce relative movement between said spot of light and said curve along one axis, means for moving said optical system and associated light spot relative to said sheet along an axis transversely of said first named axis, a photo cell arrangement for receiving the reflections of said spot from said sheet, means controlled by said arrangement for forcing the spot of light to follow the curve during the movements of said sheet and system along said axes, a contactor driven by the moving means for said optical systems, means cooperating with said contactor for emitting impulses proportional in number to the amplitude of the motion of the optical system along said first named axis, and means controlled by the movement along the second axis for varying the number of impulses emitted per unit of movement.

7. A device according to claim 6 wherein signal means are provided, said signal means being controlled by the movement along the second axis and being operable upon said light spot reaching a point on said curve where the slope of the tangent relative to said first axis is inverted.

8. In an automatic curve follower, a sheet having a curve thereon, said curve forming the boundary between a conducting and insulated surface, a rotating drum upon which said sheet is wound, an electrical contact for engaging said sheet and mounted for movement along one axis, means for unwinding said sheet to produce relative movement between said contact and said sheet along a second axis transverse to said first axis, means for forcing said contact to follow said curve during said axial movements, means for emitting impulses proportional in number to the movement of said contact along said first axis, and means controlled by the movement of said sheet along said other axis for varying the number of impulses per unit of movement.

9. In an automatic curve follower, a sheet having a curve thereon, said curve forming the boundary between a conducting and an insulated surface, a rotating drum upon which said sheet is wound, a pair of spaced electrical contacts for engaging said sheet and mounted for movement along one axis, means for unwinding said sheet to produce relative movement between said contacts and said sheet along a second axis transverse to said first axis, means for forcing said spaced contacts to straddle said curve during said axial movements, a plurality of individually operable impulse means for respectively emitting a plurality of series of impulses differing in frequency from one another and proportional in number to the unit of movement of said spaced contacts along said first axis, and means controlled by the movement of said sheet along said other axis for successively operating said impulse means one at a time.

10. In an automatic curve follower, a curve following device, a rotatable micrometer screw supporting said device for movement back and forth along one axis, means for moving said curve along a second axis transversely of said first named axis, means for forcing said device to follow said curve during said axial movements, a plurality of series of equally spaced electrical contacts cooperating with said micrometer screw, the number of contacts in each of said series differing from the other and being simultaneously movable at the same speed with relation to the device to emit electrical impulses proportional in number to the unit of movement of said device along said first axis, and means controlled by the movement along the second axis for successively operating said series one at a time.

J. BERGIER.
A. ESKENAZI.
A. HELBRONNER.